Figure 1:
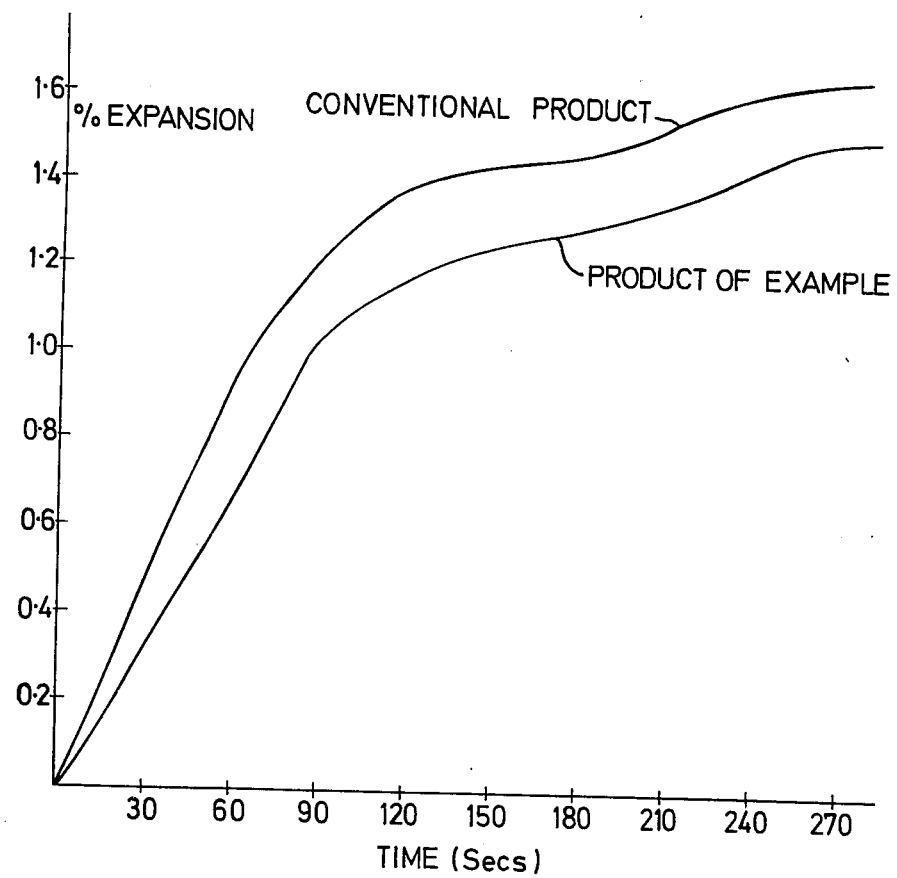

United States Patent [19]

Richards et al.

[11] 4,239,665
[45] Dec. 16, 1980

[54] NOVOLAK RESINS CONTAINING LACTOSE AND/OR GALACTOSE

[75] Inventors: Alan C. Richards, Wokingham; Riaz A. Khan, Sonning, both of England

[73] Assignee: Talres Development (N.A.) N.V., Curacao, Netherlands Antilles

[21] Appl. No.: 43,759

[22] Filed: May 30, 1979

[30] Foreign Application Priority Data

May 31, 1978 [GB] United Kingdom ............... 25586/78

[51] Int. Cl.³ .................................................. C08L 5/00
[52] U.S. Cl. .................................. 260/17.2; 264/118; 264/219
[58] Field of Search ........................................ 260/17.2

[56] References Cited

U.S. PATENT DOCUMENTS

| | | | |
|---|---|---|---|
| 1,593,342 | 7/1926 | Meigs | 260/17.2 |
| 1,815,930 | 7/1931 | Novotny et al. | 260/17.2 |
| 2,362,086 | 11/1944 | Myers et al. | 260/17.2 |
| 3,865,616 | 2/1975 | Åkerblom | 260/17.2 |
| 4,020,027 | 4/1977 | Nicholas | 260/17.2 |
| 4,048,127 | 9/1977 | Gibbons et al. | 260/17.2 |
| 4,058,403 | 11/1977 | Funabiki et al. | 260/17.2 |

OTHER PUBLICATIONS

C.A. 68:30756x, Resin-coated granular refractories, Lemon et al.

*Primary Examiner*—Edward M. Woodberry
*Attorney, Agent, or Firm*—Ostrolenk, Faber, Gerb & Soffen

[57] ABSTRACT

Resins for use in making resin-coated granules are made by preparing a novolak resin from a phenol and formaldehyde in the presence of lactose and/or galactose, using an acid catalyst. Melt-coating the resin with an amine curing agent on to particulate refractory material gives resin-coated granules which can be moulded to make foundry moulds. The lactose and/or galactose can replace part of the phenol conventionally employed in preparing novolak resins and avoids the need for plasticizers.

12 Claims, 2 Drawing Figures

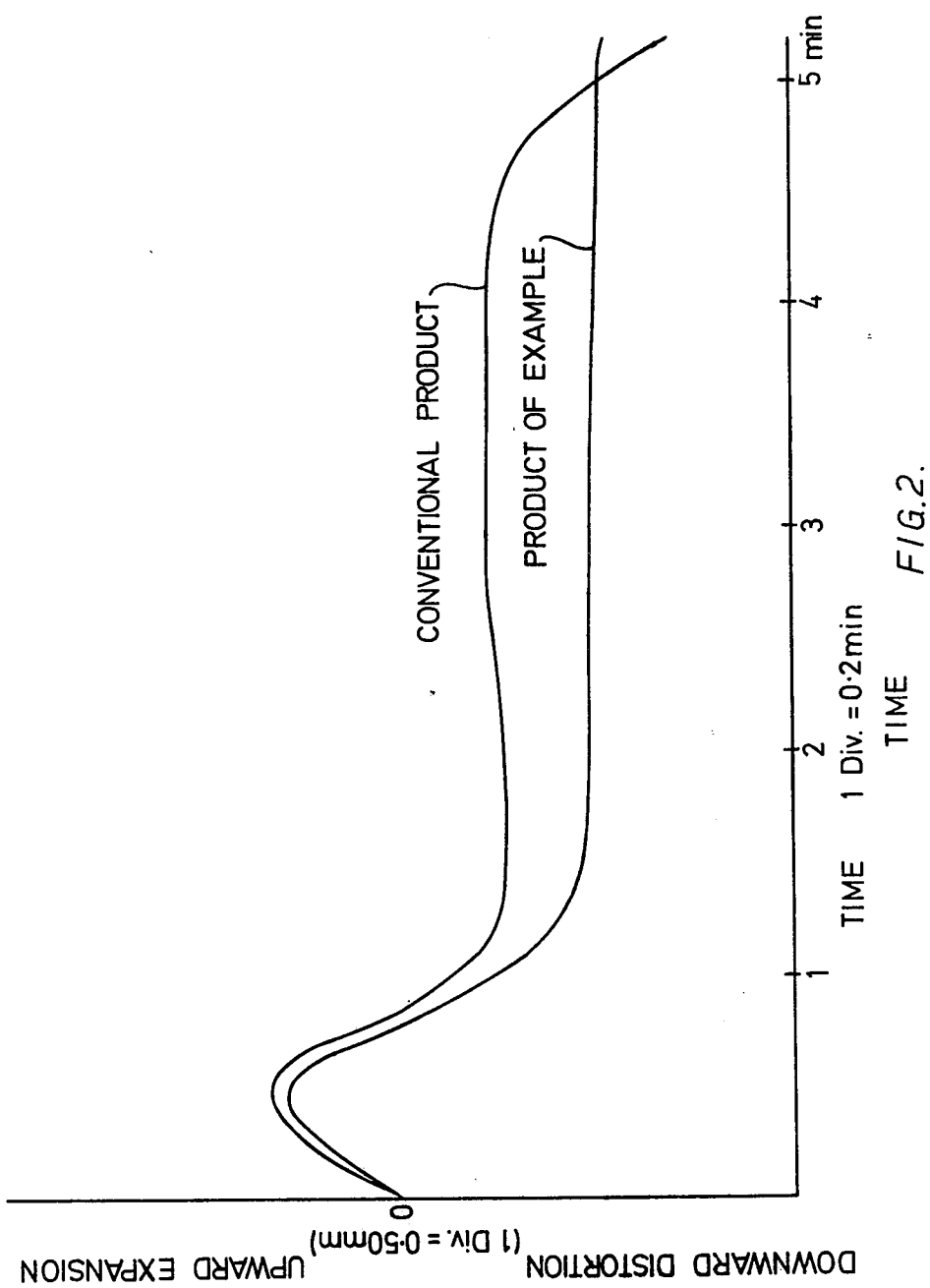

NOVOLAK RESINS CONTAINING LACTOSE AND/OR GALACTOSE

The present invention relates to phenol-formaldehyde resins and to resin-coated granules for foundry moulding.

In the casting of ferrous and non-ferrous metals, it is conventional to prepare a foundry mould using sand or other refractory particles which have been coated with a thermosetting resin. A model or "pattern" of the casting to be produced is made for example from wood, plaster, metal or plastics material. The resin-coated sand is then applied to build up and form the mould around the pattern. Removal of the pattern then gives the mould, which can be baked to cure the resin before casting or can be used as a "green", i.e. uncured, mould. In the latter case, curing occurs when the hot molten metal is poured in to the mould.

Moulds of sand can be used for most metals, and many variations have been developed. For example, in shell moulding a substantial saving of the mould material is effected by forming a mould whose shape roughly corresponds to that of the pattern which it encloses. In this way, only a relatively thin layer of mould material is needed. In common with the other processes using resin-coated sand, the process of making shell moulds can readily be adapted for the manufacture of cores. Cores are mould components which are employed when it is desired to produce cast articles which have voids such as bores.

Phenol-formaldehyde resins have been used to coat sand to give a resin-coated sand for use in foundry moulding, i.e. for use in preparing mould components such as moulds or cores. Phenol-formaldehyde resins fall into two main classes, resols and novolaks. Resols are prepared by interaction of a phenol with a molar excess of formaldehyde (commonly about 1:1.5 to 1:2) under alkaline conditions, whereas novolaks are normally prepared by the interaction of a molar excess of phenol with formaldehyde (typically 1.25:1) under acid conditions. Both the resol and novolak resins are curable to give cross-linked products and have previously been used to prepare resin-coated sands.

Ways are being investigated to improve the properties of phenol-formaldehyde resins, and to reduce the amounts of the more expensive components.

We have found that the inclusion of lactose and/or galactose in novolak resin formulations can give a resin which is suitable for coating sand or other granular refractory material and yet does not require addition of the conventional, expensive plasticisers based on wood resin from pine. The inclusion of the lactose or galactose also permits a reduction in the amount of phenol employed; typically about 15% of the phenol in a conventional formulation can be replaced.

It has previously been proposed to use sugars in the preparation of resins, though usually the precondensate is only between a sugar and a phenol. For example, each of U.S. Pat. No. 1,593,342; No. 1,753,030; No. 1,815,930; No. 1,868,216 and No. 1,923,321 describes a process in which a carbohydrate-phenol resin is prepared by condensing phenol with a saccharide or other carbohydrate and the resin is then cured, for example with hexamethylenetetramine. Of these U.S. Pat. Nos. 1,593,342 and 1,815,930 mention the use of sugars which are reducing sugars, but it is to be emphasised that no formaldehyde is used in the preparation of the initial carbohydrate-phenol resin.

U.S. Pat. No. 2,362,086 is another example of the prior proposals for employing reducing sugars in the preparation of resin products, though in this instance the reducing sugar is employed to modify the properties of a phenol-formaldehyde-amine condensate. There are many other examples of the use of sugars in resins in the early Patent literature, but it is to be emphasised that in each instance, the ultimate cured product and any precondensate is of markedly different structure and properties from those obtained by including a reducing sugar which is lactose and/or galactose in a novolak formulation.

U.S. Pat. No. 4,048,127 is a more recent disclosure of the use of sugars in the preparation of resin products. As with some of the other U.S. Patents, dextrose or a like sugar is condensed with a phenol. It is a specific object of U.S. Pat. No. 4,048,127 to prepare carbohydrate:-phenol resins in which carbohydrate is substituted for part of the phenol, and to this end a coupling agent which is a urea or a diamine is employed in the preparation of the initial condensate. Again no formaldehyde is included, and the product is thus related to the carbohydrate-phenol resins of the first five U.S. Patents mentioned above.

In U.K. Patent Specification No. 1,451,652, it has been proposed to add to a granular material, a sodium silicate binder and a carbohydrate-phenol-formaldehyde resin. This prior specification is concerned with improving the strength and other characteristics of silicate-bonded moulds and cores and discloses the use of sugars, exemplified by sucrose, dextrose and dextrin, as the carbohydrate. The resins prepared are of the resol type.

In contradistinction to the prior proposals, we provide a method of preparing a novolak resin in which a phenol and formaldehyde are condensed using an acid catalyst and in the presence of a reducing sugar which is lactose and/or galactose. The amount of the reducing sugar is most preferably such that the sugar:phenol weight ratio is about 1:5, though more generally it is preferred that the ratio is from 1:3 to 1:10.

We also provide novolak resins suitable for use in preparing resin-coated sand. The present resins are condensates obtained by condensing a phenol and formaldehyde using an acid catalyst. The resins differ from the known resins by virtue of the inclusion of a reducing sugar which is lactose and/or galactose, such reducing sugar being included during the condensation. The sugar has to be lactose and/or galactose in order to obtain the suitable coating resins. We have tested various other sugars, both reducing and non-reducing, and they are noticeably less effective. It is to be noted that galactose is one of the two sugar residues present in the disaccharide lactose.

The preferred sugar is lactose since this is not expensive and gives a granulated resin which is free-flowing and not sticky. Moreover the lactose acts as a plasticiser and it is no longer necessary to include a conventional plasticiser for certain uses, e.g. the preparation of resin-coated sand.

While the use of lactose is preferred, galactose can also be used to advantage. In particular, galactose gives a resin having properties similar to a conventional novolak when used at a phenol:galactose weight ratio of about 5:1. Furthermore, the sugar need not be pure and, for instance, it may be possible to use spray-dried milk whey (about 70% by weight lactose) instead of lactose itself; the reaction using whey is however usually slow and although there is an economic advantage, we do not prefer to use whey.

As is known for the art of formulating conventional novolak resins, a molar excess of the phenol is used relative to formaldehyde. Usually the phenol to formaldehyde ratio will be greater that 1:1 and less than 6:1; preferably it will be less than 4:1 and more preferably it will be less than 2:1.

The phenol need not be phenol itself but can be selected from other phenols such as the alkylphenols, particularly methyl—or dimethyl-phenols, or the dihydroxybenzenes. Preferred examples of the other phenols include cresols and resorcinols.

The formaldehyde can be added as such, but more preferably it is added as paraformaldehyde (a polymeric form which readily decomposes to formaldehyde) or formalin (an aqueous solution of formaldehyde, typically 70% wt/vol). In particular, the use of formalin simplifies the handling of reactants and the resultant resin can be dissolved or emulsified to give a liquid which thus facilitates coating of sand or other particulate refractory materials. Moreover, use of such a liquid composition can result in coated materials with better characteristics e.g. a faster investment rate and higher hot strength and peel back resistance.

The acid catalyst can be any of those conventionally employed in the preparation of novolak resins. For example, the catalyst can be oxalic acid, salicylic acid, hydrochloric acid or mixtures of such acids. The amount of catalyst employed is not critical, and typically will be in the range 0.05 to 5%, more usually 0.5 to 4%, based on the total weight of ingredients in the reaction.

Condensation of the phenol and formaldehyde is effected by heating, usually to a temperature of 100° C. or more and usually for at least 1 hour. If desired, the reaction can be effected in stages, with heating in second or subsequent stages being to a temperature higher than the first or preceding stages.

The present modified novolak resins can be cured in the conventional way for novolak resins and, in particular, can be cured with an amine curing agent, preferably hexamethylenetetramine (otherwise known as hexamine).

The present resins are particularly suited for use as a binder in the manufacture of foundry moulds and cores. To this end, we further provide a method of making resin-coated granules for foundry moulding which comprises melt-coating particulate refractory material such as sand with a resin of the present invention, with an amine curing agent, preferably hexamethylenetetramine, and optionally with a wax, and granulating the coated material after solidification of the resin.

Procedures and materials for preparing resin-coated particulate materials are well known and the skilled man will have no difficulty in substituting the present resins for the novolak resins which have hitherto been employed. The melt-coating preferably involves heating the particulate material, suitably a fine quartz sand, to above the melting point of the resin. Molten resin is then added, usually in an amount of 1.5 to 7% by weight of the particulate material, followed by the curing agent, such as hexamine and then by the wax, if used, which is preferably a metal soap, for example calcium stearate. Cooling of the mixture thereafter results in a solid mass which can be granulated to give the desired product. The resin-coated granules can then be used in known manner to make a mould component for use in casting of metal. Both moulds and mould cores can be made from the granules by moulding under pressure and heating.

It is to be noted that sand coated with a lactose-derived or galactose-derived resin of the present invention exhibits good resistance to delamination on investment (i.e. good peel-back resistance), and that shell moulds produced from such resin-coated sand are more easily broken away to release castings.

Examples of the present invention will now be given by way of illustration. Comparative examples are also included in the following description.

EXAMPLE 1

1 kg of lactose was reacted with 5 kg of phenol, 950 g of paraformaldehyde and 200 g of salicyclic acid. The mixture was heated for 2 hours at 160° C. and then for 5 hours at 190° C. 16 g of oxalic acid was added in two portions during the heating.

After cooling, the resin set to a solid. This product was similar to that obtained conventionally using 6 kg of phenol instead of the lactose/phenol mixture, and was used for coating sand.

Sand was heated to 140° C. and at t=30 seconds, 3.5% of the resin (based on the weight of the sand) was added after being heated to the same temperature. 1.0% water based on the weight of the sand was added at t=60 seconds, and at t=90 seconds, 12.5% of hexamethylenetetramine (based on the weight of the resin) was added. Thereafter 4.0% calcium stearate (based on the weight of the resin) was added before peak bonding occurred.

Thereafter, the mixture was cooled and then granulated to give free-flowing, resin-coated sand grains with little tendency to lump or form bridges. A shell mould was then prepared from the coated sand by moulding the same at 260° C.

The properties of the resin-coated sand were determined using standard test methods as described below. The results obtained are then shown in the following Table 1 and accompanying drawings, together with those for a conventional resin-coated sand commercially available from British Industrial Sand Ltd. The conventional product comprises sand coated using a liquid novolak resin composition manufactured by Borden (UK) Ltd. from phenol and formalin in the presence of an acid catalyst.

Tensile Strength (a) Cold. This was measured by investing the sand on to conventional foundry dog-bone shaped tensile plates to give a specimen 6.4 mm (¼ inch) thick. The specimen was then cured on the plates at a temperature of 250° C. for 10 minutes, cooled and the tensile load to break recorded using a Houndsfield Tensometer.

(b) Hot. This was measured using a Dietert Hot Shell tester with the specimen being cured for 3 minutes at 250° C.

Investment Rate

This was measured at 200° C. and is the time in seconds required to build a shell 6.4 mm thick.

Sand Melt Point

This was measured on a brass melt point bar of size 38 cm by 5 cm which was heated from one end to provide a temperature gradient of approximately 75°–110° C.

Shock Load Thermal Expansion

After 1 minute curing at 250° C., the specimen was subjected to rapid heating from room temperature to 1,000° C. using a Dietert Dilatometer.

The expansion curves are shown in FIG. 1.

Hot Distortion Test

This was carried out using the British Cast Iron Research Association hot distortion apparatus. The test involved measurement of the deviation from the horizontal of a coated surface at it was heated; the measurements when plotted gave the curves of FIG. 2.

TABLE 1

|  | Conventional Product | Product of Example |
|---|---|---|
| Tensile Strength (kg/cm$^2$) | | |
| (a) cold | 32.2 | 30.8 |
| (b) hot | 20 | 16 |
| Investment Rate (sec) | 16.5 | 15 |
| Sand Melt Point (°C.) | 87 | 89 |
| Shock Load Thermal Expansion (%) | 1.65 | 1.50 |
| Hot Distortion Test | | |
| (a) maximum expansion (mm) | 1.45 | 1.25 |
| (b) distortion (mm) | 0.8 | 2.8 |
| (c) time to break (sec) | 330 | 380 |

The results shown above and in the accompanying figures clearly show that the product of the Example is comparable in most respects to the conventional product. It is particularly to be noted from FIG. 1 that the product of the Example exhibits less expansion than the conventional product. It is therefore to be expected that the moulds made from resin-coated sand embodying the invention should exhibit increased thermal shock resistance and thus be less prone to mould cracking during heating. Moreover, from FIG. 2, it will be seen that the plotted curve for the present product falls further below the zero distortion line, indicating superior plasticity. FIG. 2 also shows less upward expansion for the present product, and reinforces the expectation regarding increased thermal shock resistance and less mould cracking.

When the paraformaldehyde of the formulation of the Example was replaced by an equivalent amount of formalin the initial resin obtained was a liquid which was easier to coat on to sand. The resultant mould obtained using the coated sand had similar characteristics to those given above for the product of the Example except that the hot strength was improved.

EXAMPLE 2

Lactose was employed at different lactose:phenol ratios for large-scale production of novolak resins based on a conventional procedure.

The lactose:phenol ratios and test results for the resultant products are shown in Table 2.

TABLE 2

|  | Lactose:Phenol Ratio | | |
|---|---|---|---|
|  | 1:5 | 1:4 | 1:3 |
| Tensile Strength (kg/cm$^2$) | | | |
| (a) cold | 22.8 | 30 | 30.6 |
| (b) hot | 13.1 | 4.3 | 4.0 |
| Investment Rate (sec) | 17.5 | 16.5 | 11.5 |
| Sand Melt Point (°C.) | 91 | 80 | 81 |
| Peel Back Resistance | very good | fair | fair |

EXAMPLES 3 AND 4 AND COMPARATIVE EXAMPLES 1 TO 4

Lactose (Example 3), galactose (Example 4) and various other sugars (Comparative Examples 1 to 4) were employed to produce novolak resins using a conventional procedure. The sugar was used to replace one-sixth by weight of the phenol, giving a sugar:phenol weight ratio of 1:5. The nature of the sugar and the corresponding test results for the resultant products are shown in Table 3.

TABLE 3

|  | Example | | Comparative Example | | | |
|---|---|---|---|---|---|---|
|  | 3 lactose | 4 galactose | 1 maltose | 2 fructose | 3 glucose | 4 sucrose |
| Tensile Strength (kg/cm$^2$) | | | | | | |
| (a) cold | 22.8 | 22.0 | 24.1 | 26.5 | 23.3 | 28.0 |
| (b) hot | 13.1 | 13.0 | 9.5 | 9.1 | 5.0 | 5.3 |
| Investment Rate (sec) | 17.5 | 17 | 18 | 16 | 17.5 | 12 |
| Sand Melt Point (°C.) | 91 | 94 | 85 | 91 | 94 | 83 |
| Peel Back Resistance | very good | very good | good | good | good | good |
| Reactivity with hexamine at 100° C. | fast | fast | acceptable | acceptable | acceptable | slow |
| Tackiness | absent | slight | present | absent | present | present |

In considering these results, it is necessary to bear in mind the need to achieve an optimum balance in properties. The following criteria are usually taken to be desirable, though the failure to meet some requirements might be adequately compensated for by an otherwise superior combination of properties.

Tensile Strength (a) cold: about 20 kg/cm$^2$ is satisfactory.
(b) hot: below 10 kg/cm$^2$ is unsatisfactory.

Investment Rate below 20 sec is satisfactory.

Sand Melt Point

80°–100° C., satisfactory: 85°–95° C. preferred.

Peel Back Resistance should be 'very good'.

Reactivity with hexamine should be 'fast'.

Tackiness should be 'absent', i.e. a free-flowing product.

It will be seen that the only sugar to give a resin which met all the criteria was lactose; galactose failed only on the subjective test of "tackiness".

Of the various criteria, the most important are probably "hot strength" and "peel back resistance", followed by "reactivity with hexamine" and "tackiness". Particularly when the results are assessed on this basis, it will be seen that the resins from maltose, fructose, glucose and sucrose are not acceptable. This finding is in contrast to the disclosure of U.K. Patent Specification No. 1,451,652. In that Specification, the nature of the sugar or other carbohydrate in the resol resin is not critical, and the resol resin is only acting as an additive for the sodium silicate binder rather than forming the binder itself as is the case with the present novolak resins.

We claim:

1. A method of preparing a novolak resin, wherein a phenol, formaldehyde and a reducing sugar selected from the group consisting of lactose, galactose and mixtures thereof are condensed in an acid catalysed reaction.

2. The method of claim 1, in which said reducing sugar is lactose.

3. The method of claim 1 in which the reducing sugar:phenol weight ratio is from 1:3 to 1:10.

4. The method of claim 3, in which said reducing sugar:phenol ratio is about 1:5.

5. The method of claim 1, wherein said phenol is phenol per se.

6. The method of claim 1, wherein said formaldehyde is employed as formalin or paraformaldehyde.

7. The method of claim 1, wherein a molar excess of a phenol selected from phenol, alkylphenols, dihydroxybenzenes, and mixtures thereof, is condensed with formaldehyde using an acid catalyst selected from oxalic acid, salicyclic acid, hydrochloric acid, and mixtures thereof.

8. In the preparation of a novolak resin from a phenol and formaldehyde, said resin being for use in coating particulate refractory to make foundry mould components, the improvement which consists in including a reducing sugar selected from lactose, galactose, and mixtures thereof, said reducing sugar being included during acid-catalysed condensation of said phenol and said formaldehyde.

9. A novolak resin which is an acid-catalysed condensate of a phenol and formaldehyde, wherein a reducing sugar selected from lactose, galactose and mixtures thereof is included in said resin during condensation preparation of said resin.

10. A method of making resin-coated granules for foundry moulding which comprises preparing a novolak resin by the method as claimed in claim 1, melt-coating particulate refractory material with said resin and with an amine curing agent, and granulating the coated material after solidification of said resin.

11. Resin-coated granules which comprise particles of refractory material coated with the novolak resin of claim 9.

12. In a method of making a foundry mould component by moulding resin-coated granules using a pattern and then removing said pattern, the improvement which comprises using resin-coated granules which are as claimed in claim 11.

* * * * *